(12) United States Patent
Kuang

(10) Patent No.: US 12,221,150 B1
(45) Date of Patent: Feb. 11, 2025

(54) FOLDING STROLLER

(71) Applicant: Junjie Kuang, Linwu County (CN)

(72) Inventor: Junjie Kuang, Linwu County (CN)

(73) Assignee: ZHONGSHAN KANGDI BABY PRODUCTS CO., LTD., Zhongshan (CN)

( * ) Notice: Subject to any disclaimer, the term of this patent is extended or adjusted under 35 U.S.C. 154(b) by 0 days.

(21) Appl. No.: 18/734,001

(22) Filed: Jun. 5, 2024

(51) Int. Cl.
  *B62B 7/06* (2006.01)
  *B62B 9/20* (2006.01)

(52) U.S. Cl.
  CPC . *B62B 7/06* (2013.01); *B62B 9/20* (2013.01)

(58) Field of Classification Search
  CPC ........................................................ B62B 7/06
  See application file for complete search history.

(56) References Cited

U.S. PATENT DOCUMENTS

| | | | | |
|---|---|---|---|---|
| 9,855,962 | B1* | 1/2018 | Chen | B62B 3/025 |
| 9,896,118 | B2* | 2/2018 | Choi | B62B 3/007 |
| 10,633,010 | B1* | 4/2020 | Zhang | B62B 3/025 |
| 10,988,153 | B1* | 4/2021 | Horowitz | B62B 7/008 |
| 11,225,277 | B1* | 1/2022 | Sun | B62B 5/061 |
| 11,498,601 | B2* | 11/2022 | Zehfuss | B62B 7/008 |
| 11,772,698 | B2* | 10/2023 | Cui | B62B 7/008 280/650 |
| D1,005,177 | S * | 11/2023 | Lin | D21/425 |
| D1,018,688 | S * | 3/2024 | Wu | D34/12 |
| 11,919,557 | B2* | 3/2024 | Pang | B62B 3/007 |
| 11,958,520 | B1* | 4/2024 | Sun | B62B 5/067 |
| 11,981,364 | B2* | 5/2024 | Ma | B62B 5/0461 |
| 2015/0145224 | A1* | 5/2015 | Zhu | B62B 3/007 280/42 |
| 2015/0151771 | A1* | 6/2015 | Jin | B62B 5/0013 280/651 |
| 2018/0057035 | A1* | 3/2018 | Choi | B62B 9/26 |
| 2019/0185038 | A1* | 6/2019 | Choi | B60B 33/02 |

* cited by examiner

Primary Examiner — Erez Gurari

(57) ABSTRACT

A folding stroller includes a framework and wheels mounted at a bottom of the framework. The framework has a folded state and an unfolded state. The framework includes a first bracket assembly, a second bracket assembly, a connecting bracket assembly and a supporting assembly. The second bracket assembly and the first bracket assembly are arranged at front and back oppositely. Two ends of the connecting bracket assembly are respectively connected to the first bracket assembly and the second bracket assembly. A connecting end of the supporting assembly is rotatably connected to the connecting bracket assembly. A sliding end of the supporting assembly is slidably connected to the first bracket assembly and the second bracket assembly.

19 Claims, 12 Drawing Sheets

FOLDING STROLLER

TECHNICAL FIELD

The present disclosure relates to the technical field of baby products, and in particular, to a folding stroller.

BACKGROUND OF THE INVENTION

With the development of the society and the improvement of the living standard, outdoor recreations have become a popular way for sports and leisure and attract more and more attentions of families. Parents and other guardians prefer to take infants and young children outdoors during their free time. As a children's product suitable for outdoor use, a stroller not only allows a baby to sit and lie in, making it convenient to take the baby to play around, but also allows for placement of some outdoor products, so that the stroller is used as a convenient and labor-saving tool for transportation.

In the prior art, there are many rods in the stroller, so that a folding component is complex, and a folding operation is cumbersome. Moreover, it is also easy to pinch the fingers of a user during folding of the stroller. Meanwhile, this type of folding stroller product still has a large volume after being folded, making it inconvenient to carry. Furthermore, the stroller is not stable in a folded state and easily deforms.

For this purpose, the present disclosure provides a folding stroller, which can effectively solve the above problems. The folding stroller has a simple structure, and a folded product has a small volume and is stable.

SUMMARY OF THE INVENTION

In order to overcome the shortcomings of the prior art, the present disclosure provides a folding stroller, which has a simple structure, and a folded product has a small volume and is stable.

The technical solution adopted by the present disclosure to solve the technical problem is as follows.

A folding stroller, includes a framework and wheels mounted at a bottom of the framework, wherein the framework has a folded state and an unfolded state; the framework includes:
  a first bracket assembly;
  a second bracket assembly, wherein the second bracket assembly and the first bracket assembly are arranged at front and back oppositely;
  a connecting bracket assembly, wherein two ends of the connecting bracket assembly are respectively connected to the first bracket assembly and the second bracket assembly; and
  a supporting assembly, wherein a connecting end of the supporting assembly is rotatably connected to the connecting bracket assembly, and a sliding end of the supporting assembly is slidably connected to the first bracket assembly and the second bracket assembly;
  when the framework is switched between the folded state and the unfolded state, the connecting end of the supporting assembly rotates relative to the connecting bracket assembly, and the sliding end of the supporting assembly slides along the first bracket assembly and the second bracket assembly; and the connecting bracket assembly rotates relative to the first bracket assembly and the second bracket assembly.

As an improvement of the present disclosure, the folding stroller further includes a locking assembly, wherein the locking assembly is arranged at the sliding end of the supporting assembly; the locking assembly moves between a locked position and an unlocked position; a locking hole is provided on the first bracket assembly and/or the second bracket assembly; and when the framework is in the unfolded state, the locking assembly moves to the locked position, and the locking assembly is inserted into the locking hole.

As an improvement of the present disclosure, the locking assembly includes a locking block and an elastic member; a locking block slot is provided at the sliding end of the supporting assembly; the locking block is slidably arranged in the locking block slot; the elastic member is arranged in the locking block slot and abuts against the locking block; and the elastic member drives the locking block to move towards the locked position.

As an improvement of the present disclosure, the locking assembly further includes a driving member and a transmission rope; the driving member is arranged on one side of the connecting bracket assembly close to the connecting end of the supporting assembly; one end of the transmission rope is connected to the driving member, and the other end of the transmission rope extends along the interior of a portion of the supporting assembly to the sliding end of the supporting assembly and is connected to the locking block.

As an improvement of the present disclosure, the connecting bracket assembly includes an upper connecting bracket assembly and a lower connecting bracket assembly; two ends of the upper connecting bracket assembly are respectively connected to an upper end of the first bracket assembly and an upper end of the second bracket assembly; and two ends of the lower connecting bracket assembly are respectively connected to a lower end of the first bracket assembly and a lower end of the second bracket assembly.

As an improvement of the present disclosure, the upper connecting bracket assembly includes a first rod, a second rod, and a third rod; a first end of the first rod is rotatably connected to the upper end of the first bracket assembly; a first end of the third rod is rotatably connected to the upper end of the second bracket assembly; and two ends of the second rod are respectively rotatably connected to a second end of the first rod and a second end of the third rod.

As an improvement of the present disclosure, the lower connecting bracket assembly includes a fourth rod, a fifth rod, and a sixth rod; a first end of the fourth rod is rotatably connected to the lower end of the first bracket assembly; a first end of the sixth rod is rotatably connected to the lower end of the second bracket assembly; and two ends of the fifth rod are respectively rotatably connected to a second end of the fourth rod and a second end of the sixth rod.

As an improvement of the present disclosure, a middle part of the second rod extends downwards to form a connecting rod; the driving member is T-shaped and is provided with a sliding channel; and the connecting rod is inserted into the sliding channel to allow the driving member to slide along the connecting rod.

As an improvement of the present disclosure, the supporting assembly includes two first supporting assemblies; connecting ends of the two first supporting assemblies are rotatably connected to the connecting rod; and sliding ends of the two first supporting assemblies are respectively slidably connected to the first bracket assembly and the second bracket assembly.

As an improvement of the present disclosure, the supporting assembly further includes two second supporting assemblies; first ends of the two second supporting assemblies are respectively rotatably connected to middle parts of the two first supporting assemblies; and second ends of the two second supporting assemblies are respectively rotatably connected to the fourth rod and the sixth rod.

As an improvement of the present disclosure, the folding stroller further includes a fixing member, wherein a first end of the fixing member is connected to the first bracket assembly; a second end of the fixing member is detachably connected to the second bracket assembly; when the framework is in the folded state, the second end of the fixing member is connected to the second bracket assembly; and when the framework is in the unfolded state, the second end of the fixing member is separated from the second bracket assembly.

As an improvement of the present disclosure, the folding stroller further includes a push rod assembly and a lock fastener, wherein the push rod assembly is rotatably connected to the first bracket assembly; the lock fastener is connected to the push rod assembly and the first bracket assembly; and the lock fastener is configured to allow for or hinder relative rotation between the push rod assembly and the first bracket assembly.

As an improvement of the present disclosure, the wheels include movable casters and fixed casters; the movable casters are connected to a bottom of the second bracket assembly; and the fixed casters are connected to a bottom of the first bracket assembly.

As an improvement of the present disclosure, the folding stroller further includes a locking member, wherein the locking member is rotatably connected to the first bracket assembly and moves between the locked position and the unlocked position; several locking slots are provided on inner sides of the fixed casters; when the locking member is rotated to the locked position, the locking member is inserted into the locking slots; and when the locking member is rotated to the unlocked position, the locking member is separated from the locking slots.

As an improvement of the present disclosure, the locking member includes a pedal and a locking rod connected to an outer side of the pedal; the pedal is configured to allow a user to step or lift; and the locking rod is inserted or separated from the locking slots.

As an improvement of the present disclosure, the locking rod includes locking portions on two sides, a connecting portion in the middle, and curved transition portions between the locking portions and the connecting portion; the pedal is connected to the connecting portion; the locking portions are inserted or separated from the locking slots; and the transition portions extend outwards in a direction facing away from the first bracket assembly.

As an improvement of the present disclosure, friction lines are arranged on an upper surface of the pedal.

As an improvement of the present disclosure, the folding stroller further includes several clamping members, wherein the clamping members are provided with openings facing downwards; the clamping members are clamped on the upper connecting bracket assembly; and the clamping members are configured to clamp and fix a lining on the upper connecting bracket assembly.

As an improvement of the present disclosure, the folding stroller further includes several supporting members, wherein the supporting members are connected to an upper part of the first bracket assembly and/or an upper part of the second bracket assembly; and the supporting members are configured to support a cover.

As an improvement of the present disclosure, the folding stroller further includes a bearing member, wherein the bearing member is connected to a middle part of the first bracket assembly and extends in a direction facing away from the first bracket assembly; and the bearing member is configured to bear and support an accommodate lining.

The present disclosure has the beneficial effects: to store the product, the first bracket assembly and the second bracket assembly are close to each other; the connecting end of the supporting assembly rotates relative to the connecting bracket assembly; and the sliding end of the supporting assembly slides upwards along the first bracket assembly and the second bracket assembly until the framework is at the folded position. At this time, the framework occupies a small area, making it convenient for storage and transportation. To use the product, the first bracket assembly and the second bracket assembly are far away from each other; the connecting end of the supporting assembly rotates relative to the connecting bracket assembly; and the sliding end of the supporting assembly slides downwards along the first bracket assembly and the second bracket assembly until the framework is at the unfolded position. At this time, an accommodating space like a cuboid is formed among the first bracket assembly, the second bracket assembly, and the connecting bracket assembly, and the supporting assembly is simultaneously connected to the first bracket assembly, the second bracket assembly, and the connecting bracket assembly, so that the product is more stable in structure, and the product strength is improved.

BRIEF DESCRIPTION OF DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE INVENTION

Figure 1:
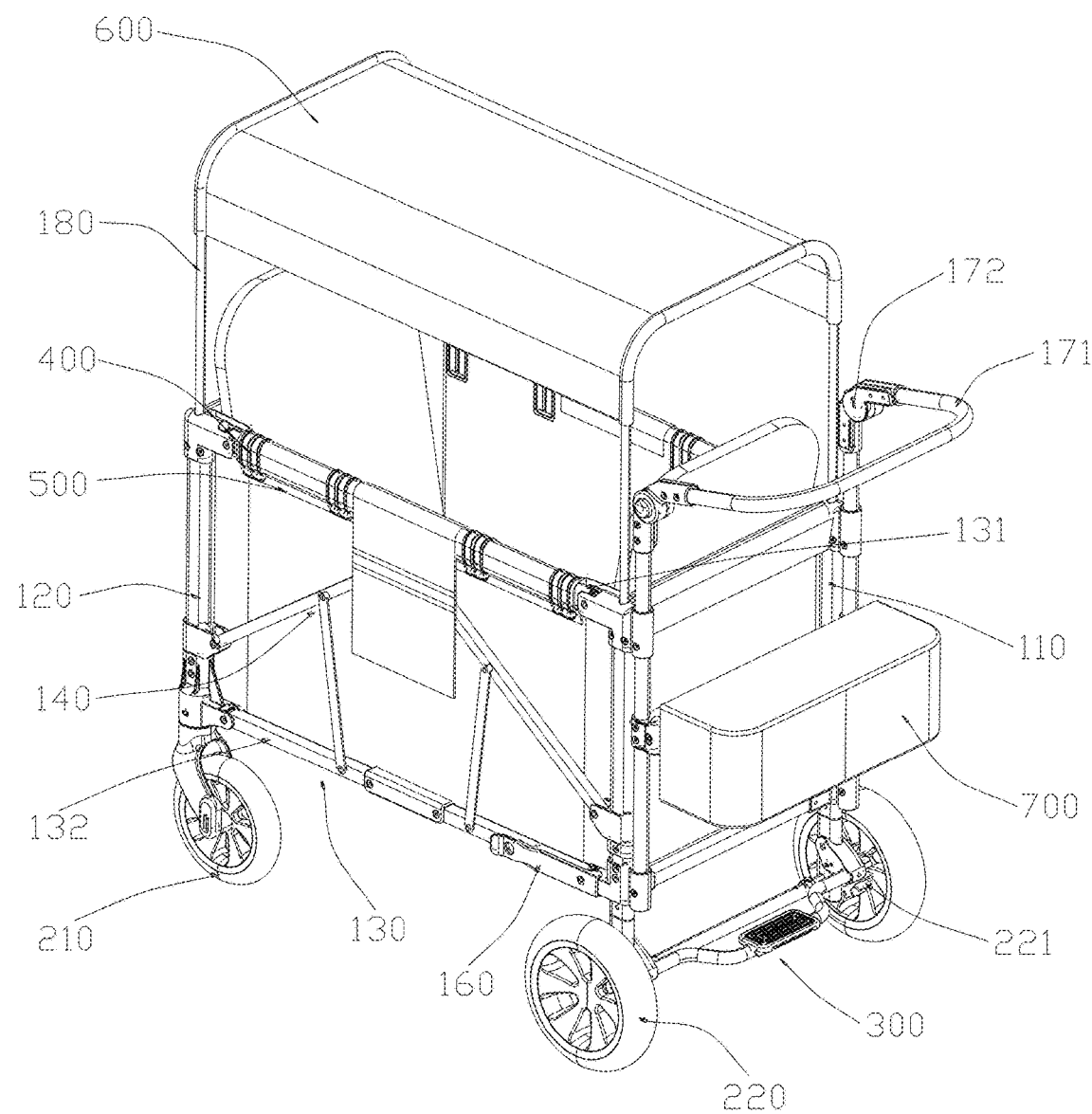
FIG. 1 is a schematic diagram of a usage state of the present disclosure.
Figure 2:
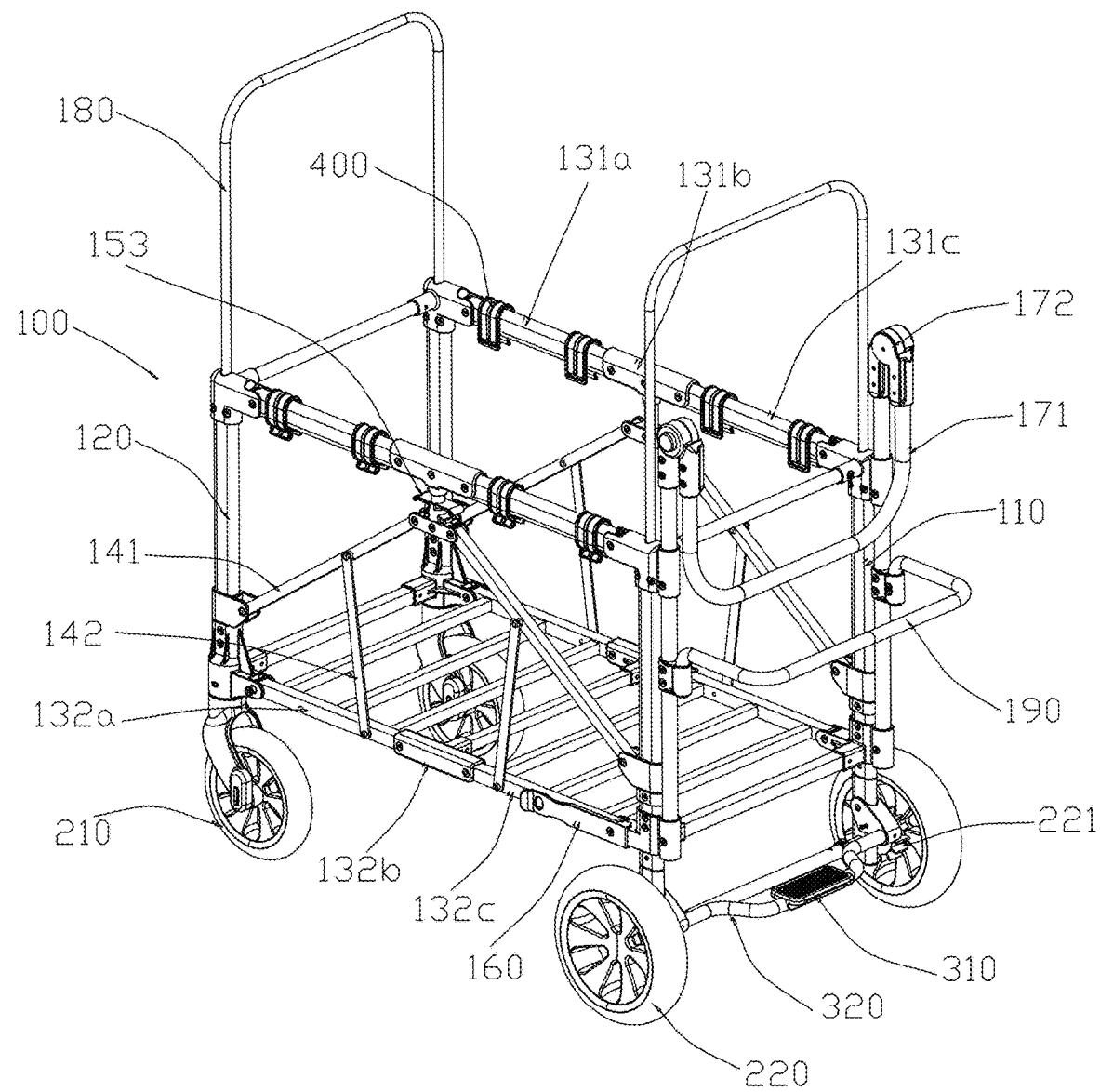
FIG. 2 is a schematic structural diagram of a first embodiment of the present disclosure.
Figure 3:
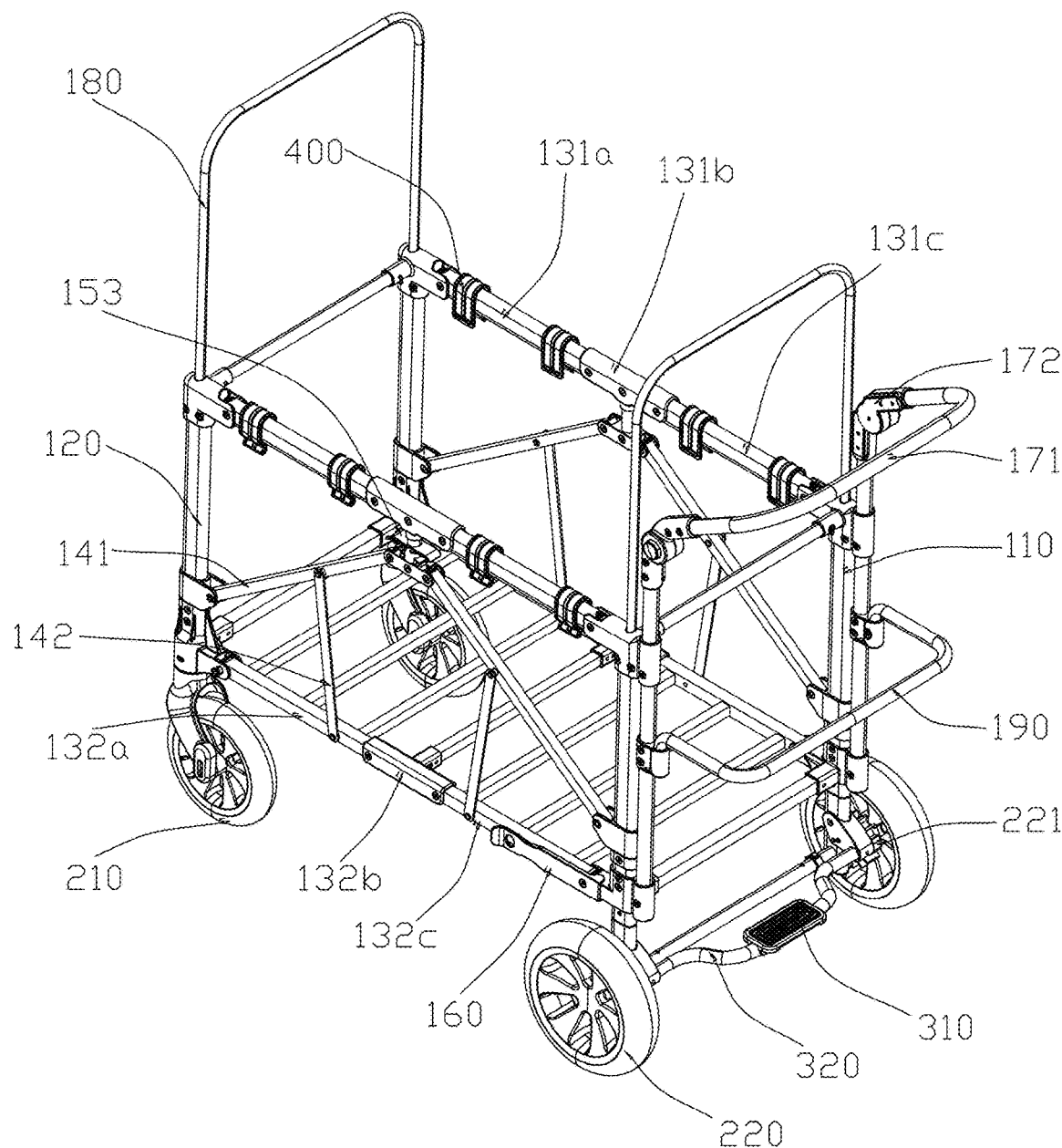
FIG. 3 is a schematic diagram of a push rod assembly in an opened state in a first embodiment of the present disclosure.
Figure 4:
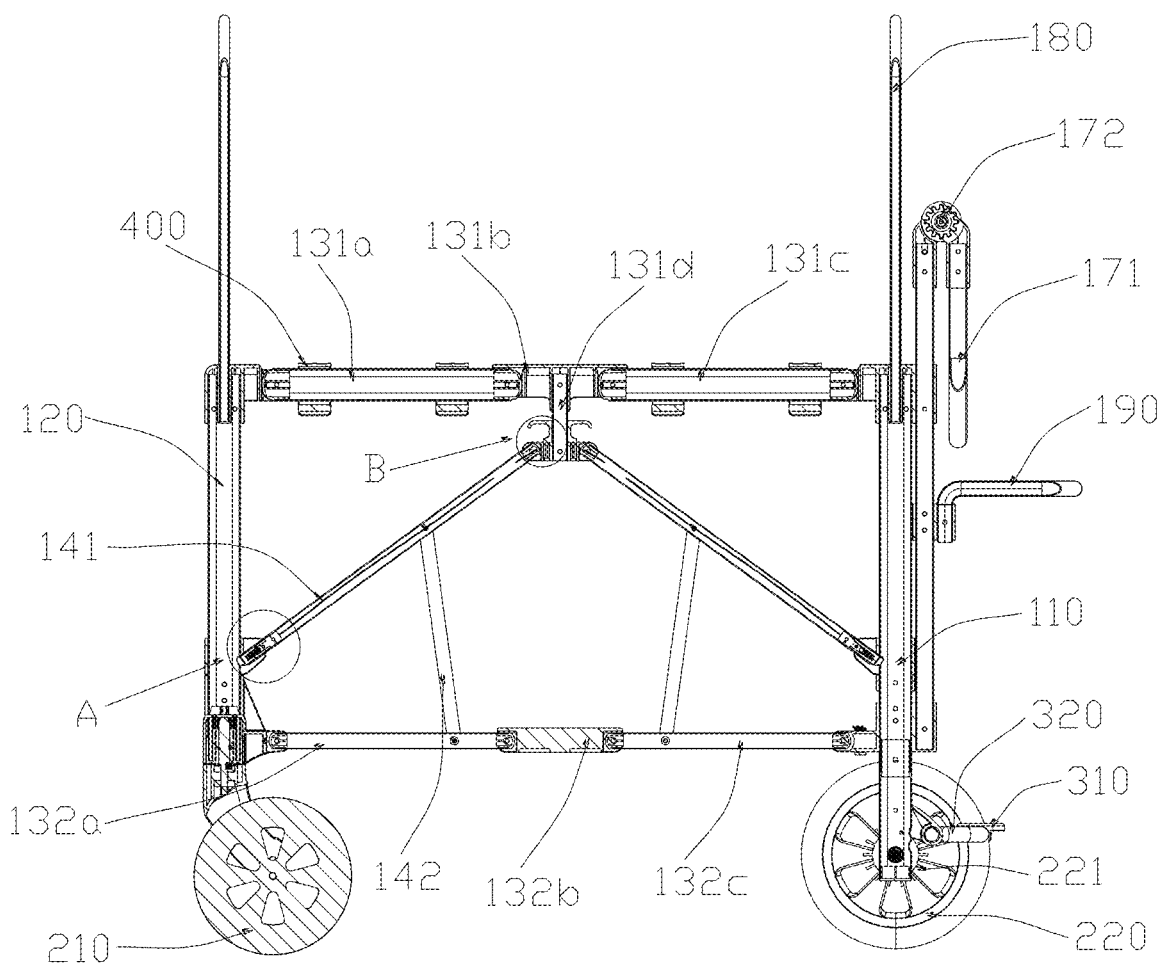
FIG. 4 is a schematic diagram of a cross-sectional structure according to a first embodiment of the present disclosure.
Figure 5:
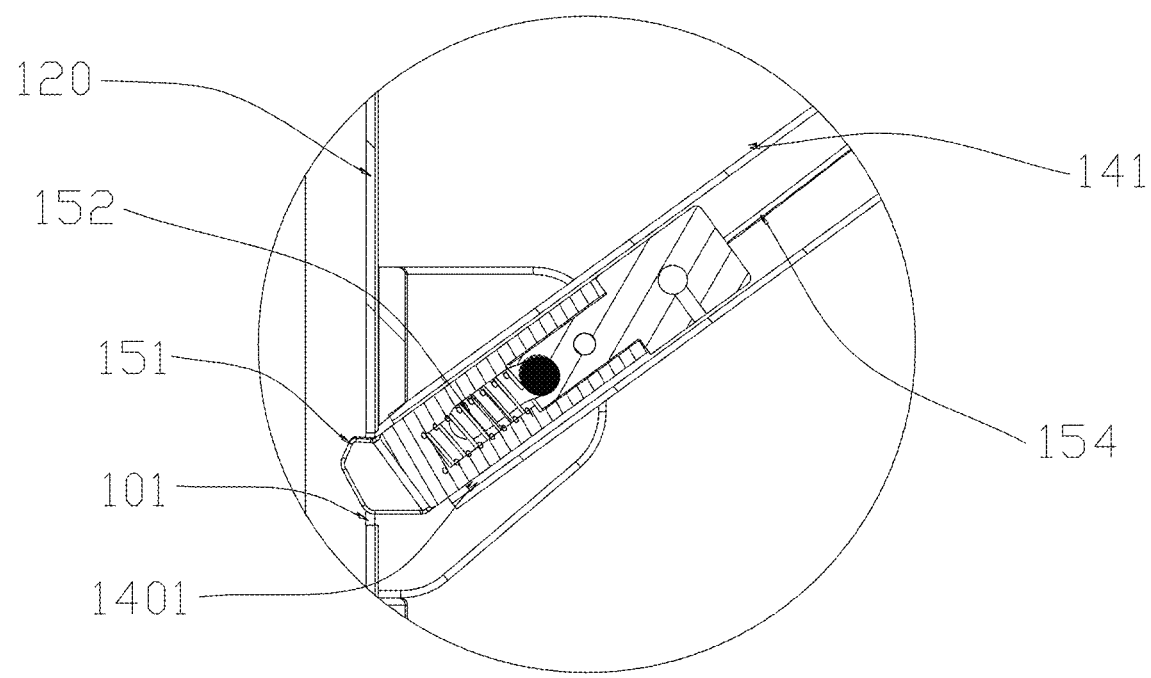
FIG. 5 is an enlarged view of circle A in FIG. 4.
Figure 6:
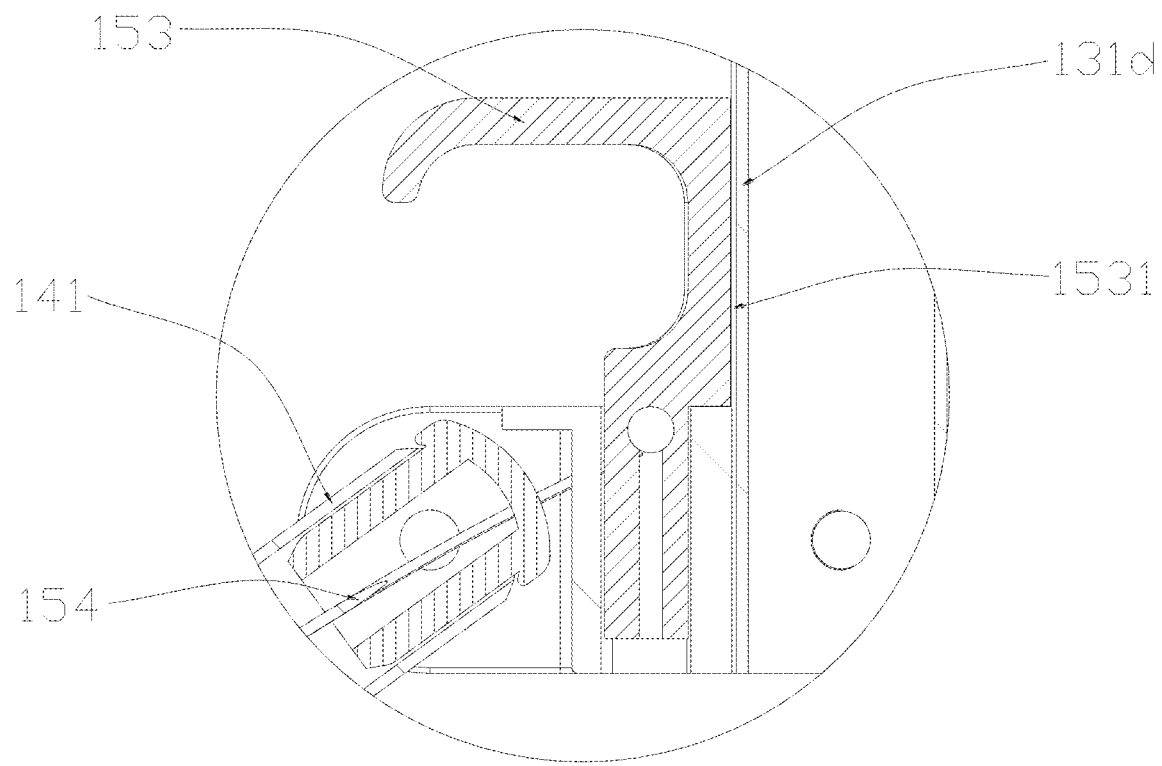
FIG. 6 is an enlarged view of circle B in FIG. 4.
Figure 7:
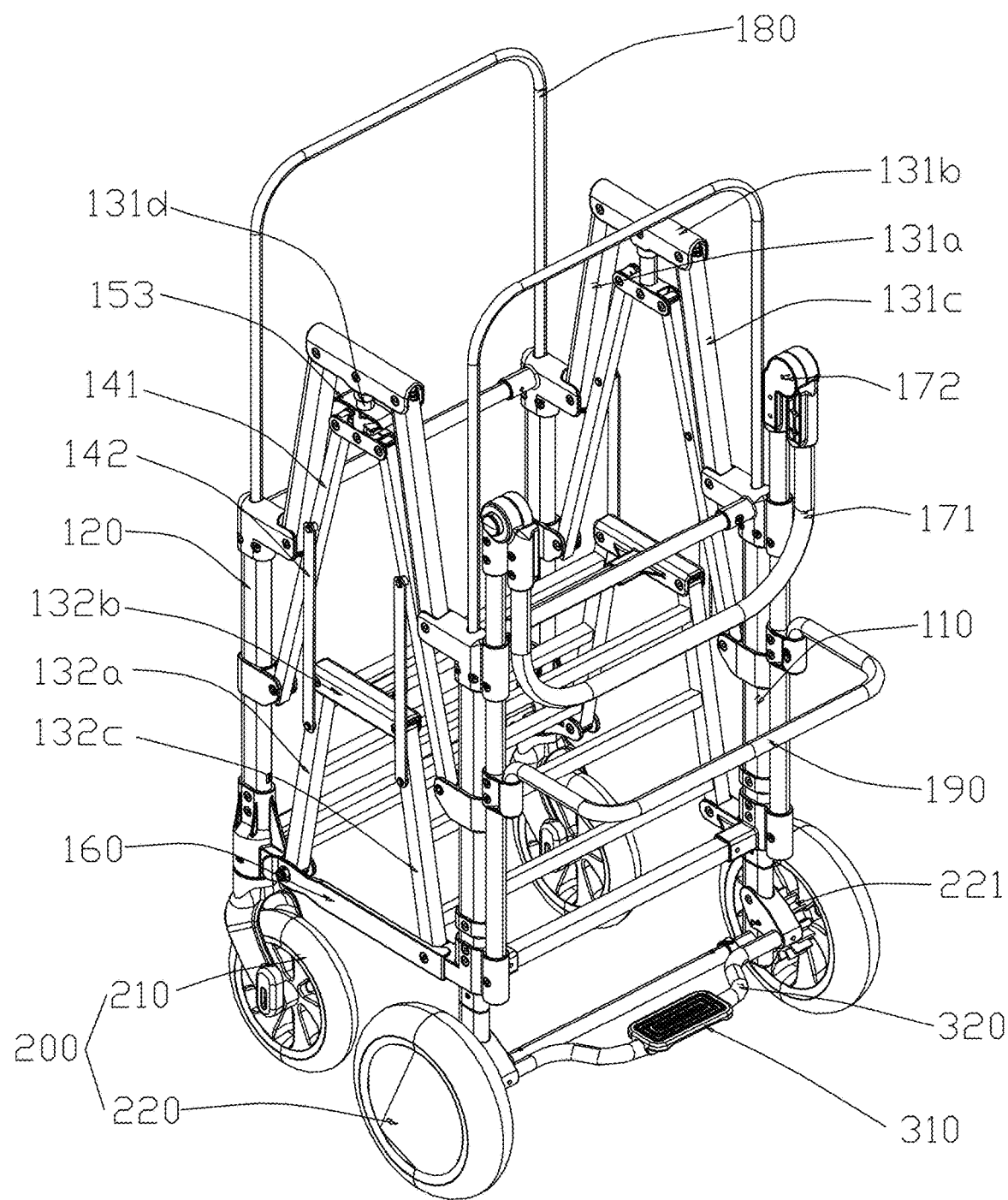
FIG. 7 is a schematic structural diagram of a folded state of a first embodiment of the present disclosure.
Figure 8:
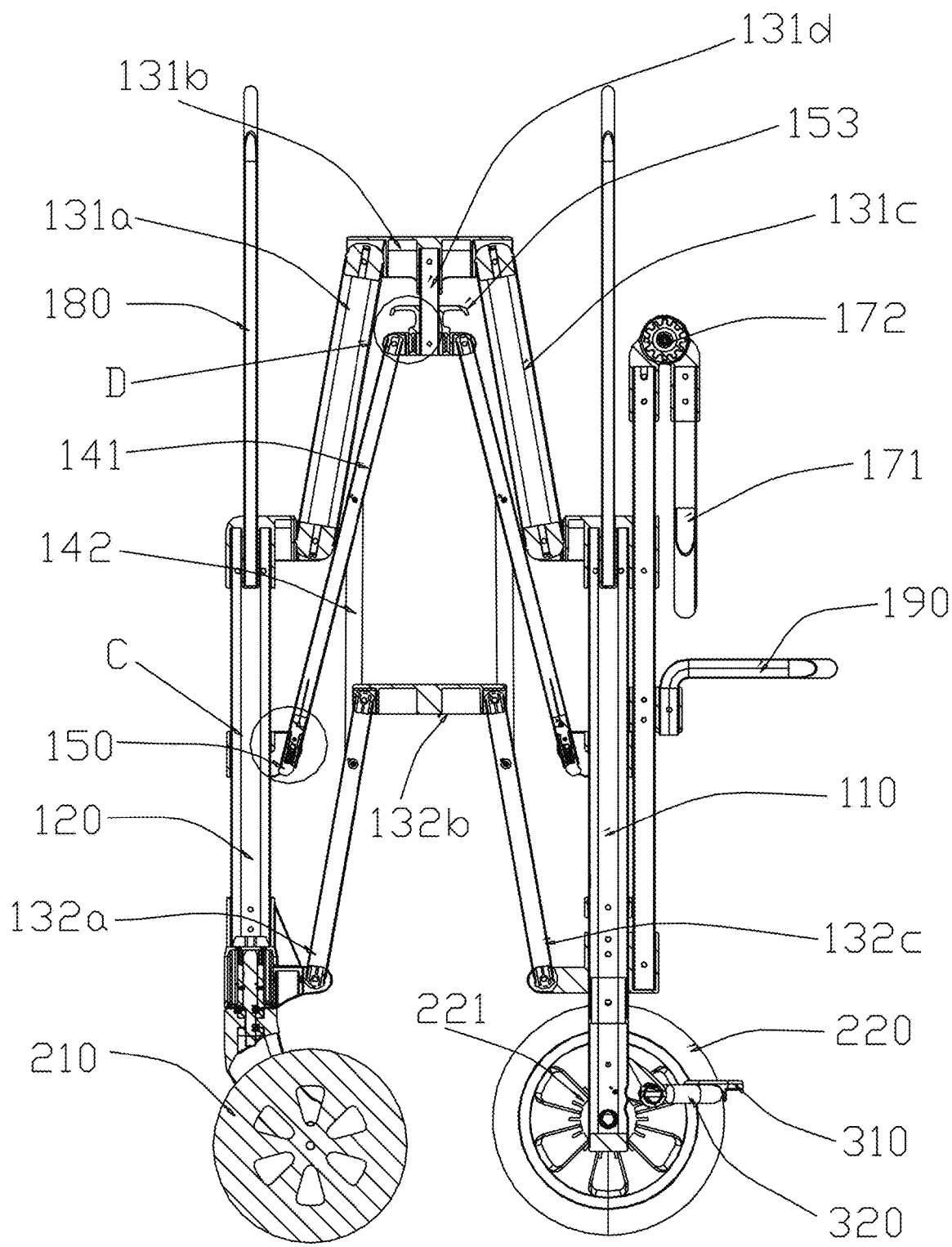
FIG. 8 is a sectional view of a folded state of a first embodiment of the present disclosure.
Figure 9:
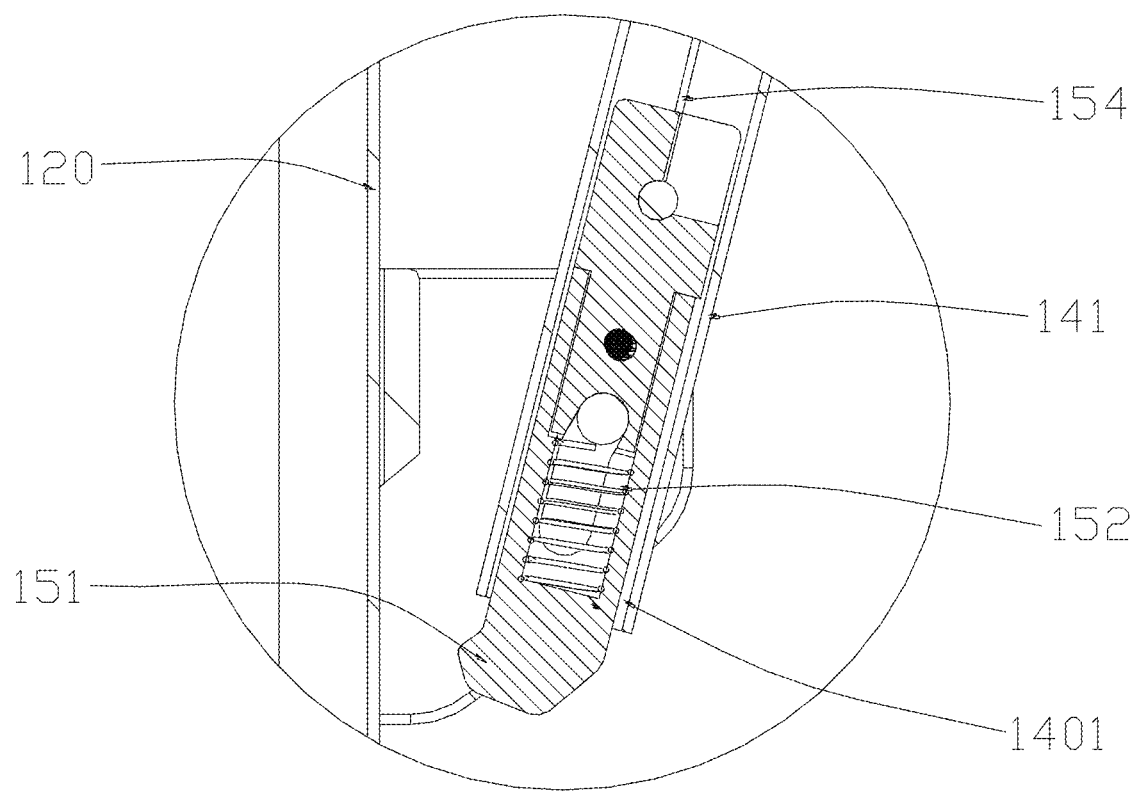
FIG. 9 is an enlarged view of circle C in FIG. 8.
Figure 10:
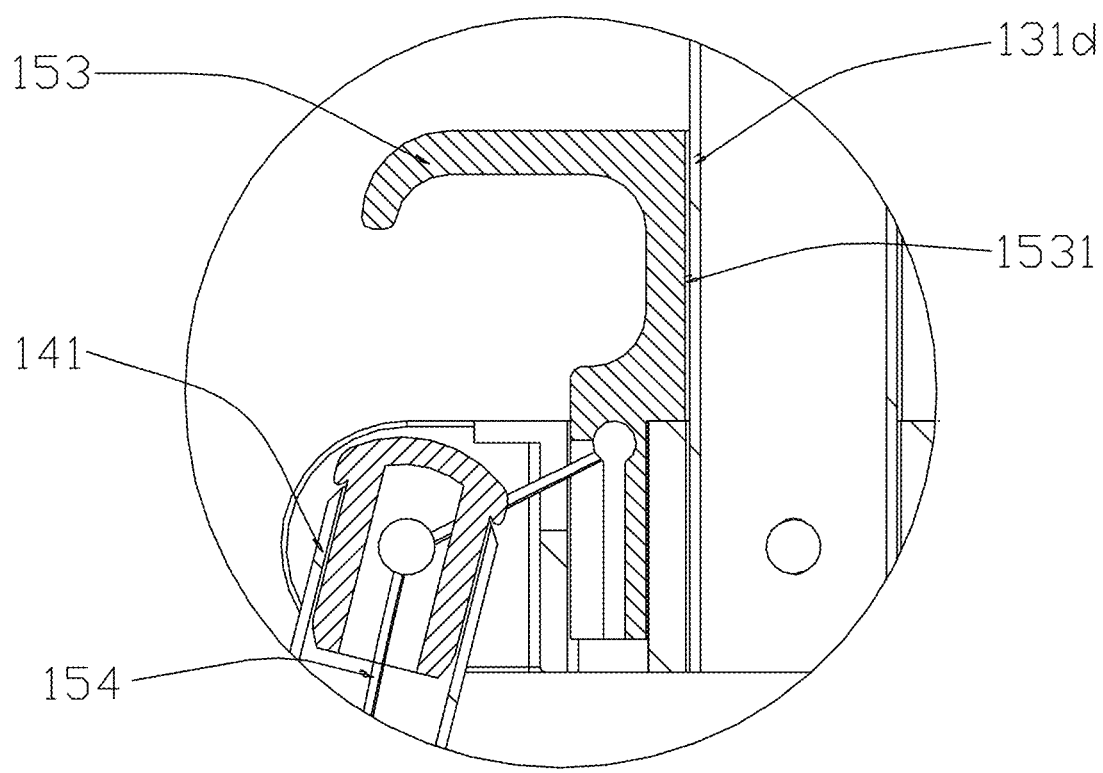
FIG. 10 is an enlarged view of circle D in FIG. 8.
Figure 11:
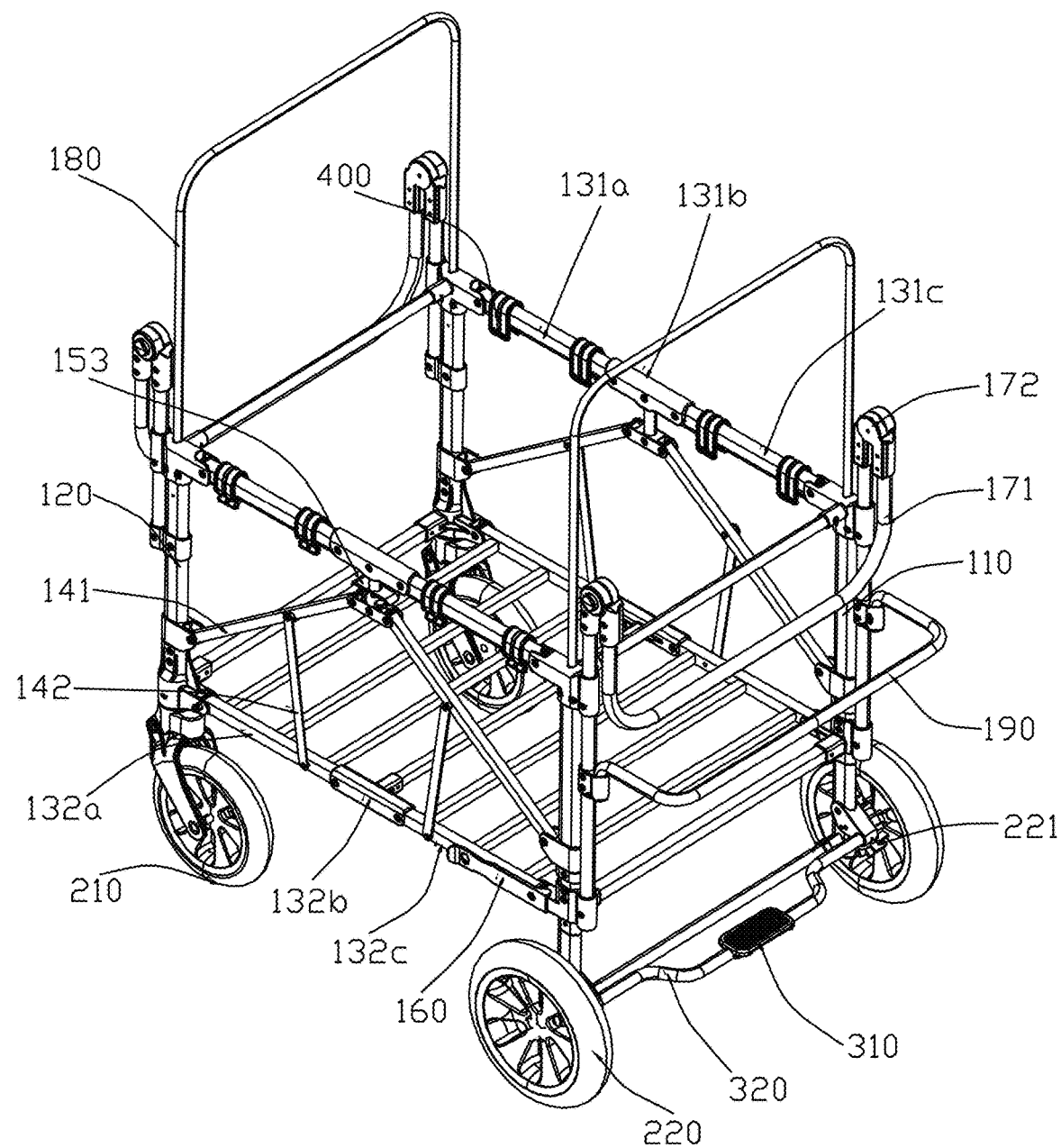
FIG. 11 is a schematic structural diagram of a second embodiment of the present disclosure.
Figure 12:
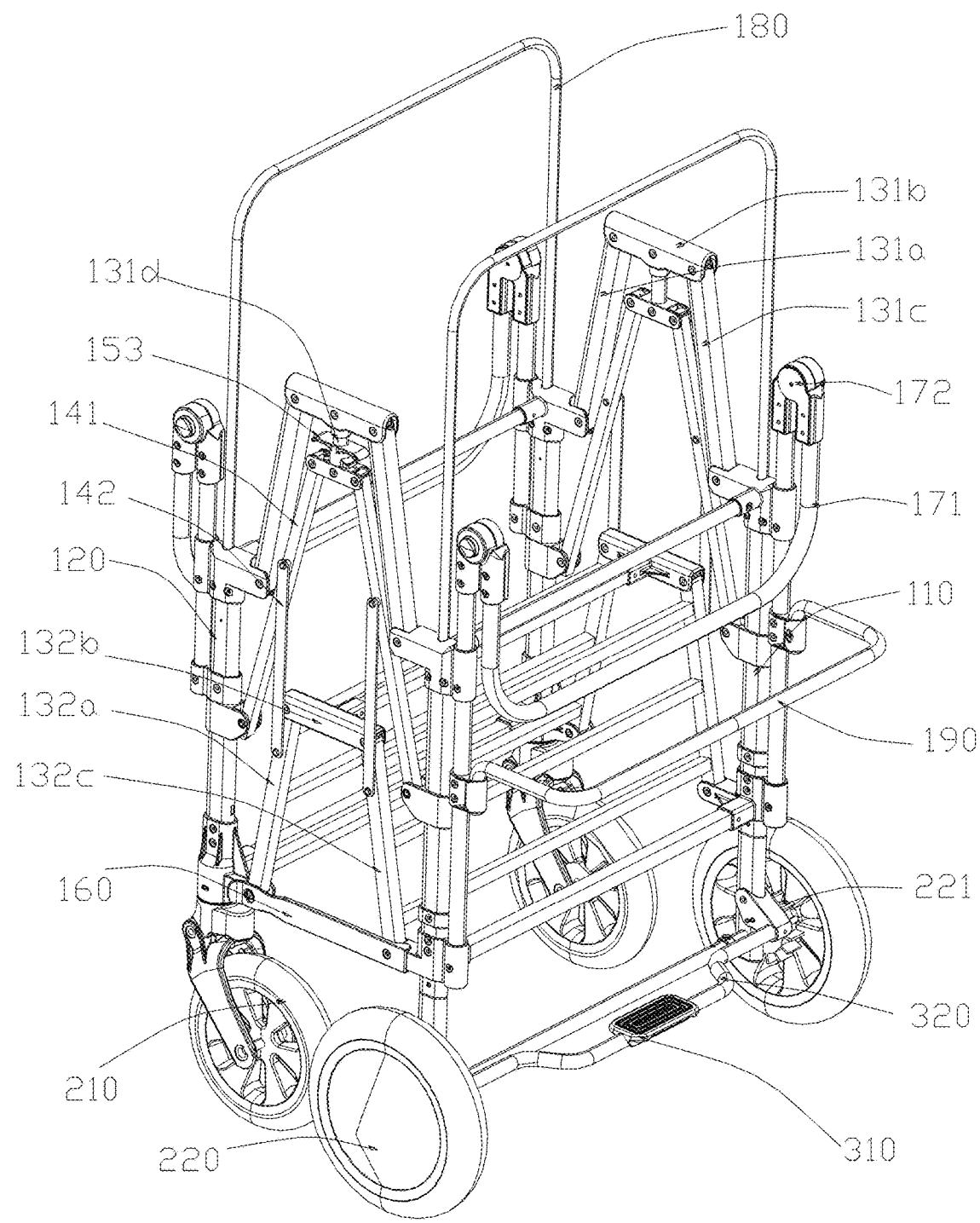
FIG. 12 is a schematic structural diagram of a folded state of a second embodiment of the present disclosure.
Figure 13:
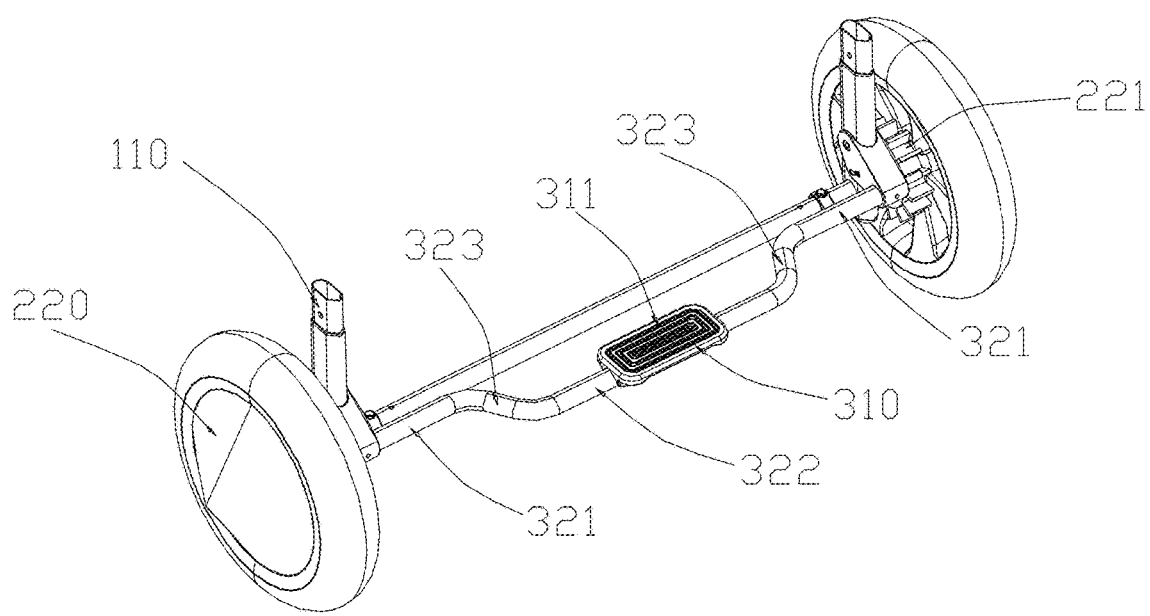
FIG. 13 is a partially schematic diagram of a first embodiment of the present disclosure.

Referring to FIG. 1 to FIG. 13, a folding stroller includes a framework 100 and wheels 200 mounted at a bottom of the framework 100; the framework has a folded state and an unfolded state; the framework 100 includes:

a first bracket assembly 110;

a second bracket assembly 120, wherein the second bracket assembly 120 and the first bracket assembly 110 are arranged at front and back oppositely;

a connecting bracket assembly 130, wherein two ends of the connecting bracket assembly 130 are respectively connected to the first bracket assembly 110 and the second bracket assembly 120; and a supporting assembly 140, wherein a connecting end of the supporting assembly 140 is rotatably connected to the connecting bracket assembly 130, and a sliding end of the supporting assembly 140 is slidably connected to the first bracket assembly 110 and the second bracket assembly 120;

when the framework 100 is switched between the folded state and the unfolded state, the connecting end of the supporting assembly 140 rotates relative to the connecting bracket assembly 130, and the sliding end of the supporting assembly 140 slides along the first bracket assembly 110 and the second bracket assembly 120; and the connecting bracket assembly 130 rotates relative to the first bracket assembly 110 and the second bracket assembly 120.

By the arrangement of the above structure, to store the product, the first bracket assembly 110 and the second bracket assembly 120 are close to each other; the connecting end of the supporting assembly 140 rotates relative to the connecting bracket assembly 130; and the sliding end of the supporting assembly 140 slides upwards along the first bracket assembly 110 and the second bracket assembly 120 until the framework 100 is at the folded position. At this time, the framework 100 occupies a small area, making it convenient for storage and transportation. To use the product, the first bracket assembly 110 and the second bracket assembly 120 are far away from each other; the connecting end of the supporting assembly 140 rotates relative to the connecting bracket assembly 130; and the sliding end of the supporting assembly 140 slides downwards along the first bracket assembly 110 and the second bracket assembly 120 until the framework 100 is at the unfolded position. At this time, an accommodating space like a cuboid is formed among the first bracket assembly 110, the second bracket assembly 120, and the connecting bracket assembly 130, and the supporting assembly 140 is simultaneously connected to the first bracket assembly 110, the second bracket assembly 120, and the connecting bracket assembly 130, so that the product is more stable in structure, and the product strength is improved.

In this embodiment, the folding stroller further includes a locking assembly 150; the locking assembly 150 is arranged at the sliding end of the supporting assembly 140; the locking assembly 150 moves between a locked position and an unlocked position; a locking hole 101 is provided on the first bracket assembly 110 and/or the second bracket assembly 120; and when the framework 100 is in the unfolded state, the locking assembly 150 moves to the locked position, and the locking assembly 150 is inserted into the locking hole 101. By the arrangement of the above structure, during use, the framework 100 is adjusted to the unfolded state; and the locking assembly 150 is moved to the locked position and inserted into the locking hole 101. This can effectively hinder relative sliding of the sliding end of the supporting assembly 140 to the first bracket assembly 110 and/or the second bracket assembly 120, thereby fixing the framework 100 in the unfolded state, improving the stability of the product, and ensuring the safety of use of the product. When the locking assembly 150 is moved to the unlocked position and is separated from the locking hole 101, the sliding end of the supporting assembly 140 can slide along the first bracket assembly 110 and/or the second bracket assembly 120, thereby allowing the framework 100 to be switched to the folded state for convenient storage and transportation.

In this embodiment, the locking assembly 150 includes a locking block 151 and an elastic member 152; a locking block slot 1401 is provided at the sliding end of the supporting assembly 140; the locking block 151 is slidably arranged in the locking block slot 1401; the elastic member 152 is arranged in the locking block slot 1401 and abuts against the locking block 151; and the elastic member 152 drives the locking block 151 to move towards the locked position. By the arrangement of the above structure, the elastic potential energy of the elastic member 152 can drive the locking block 151, so that the locking block 151 have a trend to move towards the locked position. When the framework 100 is at the unfolded position, the locking block 151 directly faces the locking hole 101. Under the action of the elastic member 152, the locking block 151 is inserted into the locking hole 101 to fix the sliding end of the supporting assembly 140 with the first bracket assembly 110 and/or the second bracket assembly 120, thereby improving the stability of the product and ensuring the safety of use of the product. When the framework 100 is separated from the unfolded position, the locking block 151 is separated from the locking hole 101, and the locking block 151 abuts against and slides along an outer surface of the first bracket assembly 110 and/or the second bracket assembly 120, so that the framework 100 can be allowed to be switched to the folded state for convenient storage and transportation.

In this embodiment, the locking assembly 150 further includes a driving member 153 and a transmission rope 154; the driving member 153 is arranged on one side of the connecting bracket assembly 130 close to the connecting end of the supporting assembly 140; one end of the transmission rope 154 is connected to the driving member 153, and the other end of the transmission rope 154 extends along the interior of a portion of the supporting assembly 140 to the sliding end of the supporting assembly 140 and is connected to the locking block 151. By the arrangement of the above structure, during use, a user can move the driving member 153 to drive the transmission rope 154, thus driving the locking block 151 to move towards the unlocked position and be separated from the locking hole 101, achieving an unlocking action, thereby allowing the framework 100 to be switched from the unfolded state to the folded state to facilitate the operation of the user. In this embodiment, the user can grip the middle part of the supporting assembly 140 on the upper side with a palm and hook up and move the driving member 153 with a finger. This can achieve one hand unlocking and facilitate the user to fold and store the product.

In this embodiment, the connecting bracket assembly 130 includes an upper connecting bracket assembly 131 and a lower connecting bracket assembly 132; two ends of the upper connecting bracket assembly 131 are respectively connected to an upper end of the first bracket assembly 110 and an upper end of the second bracket assembly 120; and two ends of the lower connecting bracket assembly 132 are respectively connected to a lower end of the first bracket assembly 110 and a lower end of the second bracket assembly 120. By the arrangement of the above structure, the upper connecting bracket assembly 131 and the lower connecting bracket assembly 132 cooperate with the first bracket assembly 110 and the second bracket assembly 120 to form a main body portion of the framework 100. An accommodating space like a cuboid is formed between the first bracket assembly 110, the second bracket assembly 120, the upper connecting bracket assembly 131, and the lower connecting bracket assembly 132, so that a baby can be allowed to sit and lie in the accommodating space. Furthermore, the upper connecting bracket assembly 131 is connected to the upper end of the first bracket assembly 110 and the upper end of the second bracket assembly 120, and the lower connecting bracket assembly 132 is connected to the lower end of the first bracket assembly 110 and the lower end of the second bracket assembly 120, so that the first bracket assembly 110 and the second bracket assembly 120 are uniformly stressed in the upper and lower ends. The product has high stability.

In this embodiment, the upper connecting bracket assembly 131 includes a first rod 131a, a second rod 131b, and a third rod 131c; a first end of the first rod 131a is rotatably connected to the upper end of the first bracket assembly 110; a first end of the third rod 131c is rotatably connected to the upper end of the second bracket assembly 120; and two ends of the second rod 131b are respectively rotatably connected to a second end of the first rod 131a and a second end of the third rod 131c. By the arrangement of the above structure, the first rod 131a, the second rod 131b, and the third rod 131c can be rotatably connected in sequence. When the framework 100 is at the unfolded position, the first rod 131a, the second rod 131b, and the third rod 131c are located on the same straight line to form the stable and linear upper connecting bracket assembly 131, thus effectively connecting the upper end of the first bracket assembly 110 to the upper end of the second bracket assembly 120. When the framework 100 is switched to the folded state, the second rod 131b moves upwards, and the first rod 131a and the third rod 131c rotate relative to the second rod 131b. A structure like an isosceles trapezoid is formed between the first rod 131a, the second rod 131b, and the third rod 131c, which can make the first bracket assembly 110 and the second bracket assembly 120 close to each other. The framework 100 occupies a small area, and storage and transportation can be facilitated.

In this embodiment, the lower connecting bracket assembly 132 includes a fourth rod 132a, a fifth rod 132b, and a sixth rod 132c; a first end of the fourth rod 132a is rotatably connected to the lower end of the first bracket assembly 110; a first end of the sixth rod 132c is rotatably connected to the lower end of the second bracket assembly 120; and two ends of the fifth rod 132b are respectively rotatably connected to a second end of the fourth rod 132a and a second end of the sixth rod 132c. By the arrangement of the above structure, the fourth rod 132a, the fifth rod 132b, and the sixth rod 132c can be rotatably connected in sequence. When the framework 100 is at the unfolded position, the fourth rod 132a, the fifth rod 132b, and the sixth rod 132c are located on the same straight line to form the stable and linear upper connecting bracket assembly 132, thus effectively connecting the lower end of the first bracket assembly 110 to the lower end of the second bracket assembly 120. When the framework 100 is switched to the folded state, the fifth rod 132b moves upwards, and the fourth rod 132a and the sixth rod 132c rotate relative to the fifth rod 132b. A structure like an isosceles trapezoid is formed between the fourth rod 132a, the fifth rod 132b, and the sixth rod 132c, which can make the first bracket assembly 110 and the second bracket assembly 120 close to each other. The framework 100 occupies a small area, and storage and transportation can be facilitated.

In this embodiment, a middle part of the second rod 131b extends downwards to form a connecting rod 131d; the driving member 153 is T-shaped and is provided with a sliding channel 1531; and the connecting rod 131d is inserted into the sliding channel 1531 to allow the driving member 153 to slide along the connecting rod 131d. By the arrangement of the above structure, during use, the connecting rod 131d is inserted into the sliding channel 1531, and a user can grip or lean against the upper part of the second rod 131b with a palm and hook up the upper part of the T-shaped driving member 153 with a finger, which can enable the driving member 153 to slide upwards to facilitate unlocking. When the framework 100 is at the unfolded position and the user releases the driving member 153, the elastic member 152 drives the locking block 151 to be reset and inserted into the locking hole 101, thereby driving the driving member 153 to be reset through the transmission rope 154. The sliding channel 1531 cooperates with the connecting rod 131d, so that the driving member 153 can be reset more stably to an initial position.

In this embodiment, the supporting assembly 140 includes two first supporting assemblies 141; connecting ends of the two first supporting assemblies 141 are rotatably connected to the connecting rod 131d; and sliding ends of the two first supporting assemblies 141 are respectively slidably connected to the first bracket assembly 110 and the second bracket assembly 120. By the arrangement of the above structure, the connecting ends of the first supporting assemblies 141 are connected to the connecting rod 131d, and the sliding ends of the first supporting assemblies 141 are connected to the first bracket assembly 110 and/or the second bracket assembly 120; the first supporting assemblies 141 are obliquely arranged between the upper connecting bracket assembly 131 and the first bracket assembly 110, as well as the second bracket assembly 120, which can stably support the upper connecting bracket assembly 131, the first bracket assembly 110, and the second bracket assembly 120 and improve the stability of the product. Moreover, the connecting ends of the first supporting assemblies 141 can rotate relative to the connecting rod 131d, and the sliding ends of the first supporting assemblies 141 can slide along the first bracket assembly 110 and the second bracket assembly 120, so that the framework 100 can be allowed to deform to the folded state to facilitate a user to store the product.

In this embodiment, the supporting assembly 140 further includes two second supporting assemblies 142; first ends of the two second supporting assemblies 142 are respectively rotatably connected to middle parts of the two first supporting assemblies 141; and second ends of the two second supporting assemblies 142 are respectively rotatably connected to the fourth rod 132a and the sixth rod 132c. By the arrangement of the above structure, the first ends of the second supporting assemblies 142 are connected to the middle parts of the first supporting assemblies 141, and the second ends of the second supporting assemblies 142 are connected to the fourth rod 132a and the sixth rod 132c, so that the first supporting assemblies 141 and the lower connecting bracket assembly 132 can be supported, the stability of the product is further improved, and the product is firmer and more durable. Meanwhile, the upper connecting bracket assembly 131 and the lower connecting bracket assembly 132 can deform synchronously when the framework 100 is folded. A user only needs to pull the driving member 153 upwards to enable the second rod 131b to move upwards, and the fifth rod 132b also moves upwards. This facilitates the operation of the user. It is more convenient for the framework 100 to fold, and the deformation of the product is simpler and smoother.

In this embodiment, the folding stroller further includes a fixing member 160; a first end of the fixing member 160 is connected to the first bracket assembly 110; a second end of the fixing member 160 is detachably connected to the second bracket assembly 120; when the framework 100 is in the folded state, the second end of the fixing member 160 is connected to the second bracket assembly 120; and when the framework 100 is in the unfolded state, the second end of the fixing member 160 is separated from the second bracket assembly 120. By the arrangement of the above structure, during use, the framework 100 is adjusted to the folded state. At this time, a distance between the first bracket assembly 110 and the second bracket assembly 120 is shortened; the second end of the fixing member 160 is connected to the second bracket assembly 120, which can hinder the first bracket assembly 110 to move away from the second bracket assembly 120, thereby hindering the framework 100 from being switched to the unfolded state, improving the stability of storage and transportation of the product, and facilitating a user to store and transport the product; and separating the second end of the fixing member 160 from the second bracket assembly 120 can allow the framework 100 to be switched to the unfolded state.

In this embodiment, the folding stroller further includes a push rod assembly 171 and a lock fastener 172; the push rod assembly 171 is rotatably connected to the first bracket assembly 110; the lock fastener 172 is connected to the push rod assembly 171 and the first bracket assembly 110; and the lock fastener 172 is configured to allow for or hinder relative rotation between the push rod assembly 171 and the first bracket assembly 110. By the arrangement of the above structure, during use, the push rod assembly 171 is rotated to enable a gripping end of the push rod assembly 171 to be away from the first bracket assembly 110; the lock fastener 172 is moved to fix the push rod assembly 171, which can facilitate a user to grip the gripping end of the push rod assembly 171 and push and pull the product. Furthermore, the user can rotate the push rod assembly 171 according to a need to adjust an angle between the push rod assembly 171 and the first bracket assembly 110, thereby adjusting a height of the gripping end of the push rod assembly 171 to improve the comfort level of the product. Different users can have appropriate gripping heights, making it more convenient to use. When the push rod assembly 171 is rotated to fit the first bracket assembly 110, the push rod assembly 171 can be effectively stored, so that a length of the product is reduced, and transportation and storage of the product are facilitated.

In this embodiment, the wheels 200 include movable casters 210 and fixed casters 220; the movable casters 210 are connected to a bottom of the second bracket assembly 120; and the fixed casters 220 are connected to a bottom of the first bracket assembly 110. By the arrangement of the above structure, during use, the movable casters 210 and the fixed casters 220 can cooperate to facilitate a user to push the framework 100, so that it is more convenient to move the product. Moreover, the movable casters 210 can rotate around a vertical axis to allow the movable casters 210 to change a direction, thereby facilitating the users to change a movement direction of the stroller and simplifying the operation.

In this embodiment, the folding stroller further includes a locking member 300; the locking member 300 is rotatably connected to the first bracket assembly 110 and moves between the locked position and the unlocked position; several locking slots 221 are provided on inner sides of the fixed casters 220; when the locking member is rotated to the locked position, the locking member 300 is inserted into the locking slots 221; and when the locking member 300 is rotated to the unlocked position, the locking member 300 is separated from the locking slots 221. By the arrangement of the above structure, during use, the locking member 300 is rotated to the locked position. At this time, the locking member 300 is inserted into the locking slots 221, and the locking member 300 hinders the rotation of the fixed casters 220, thereby hindering the movement of the stroller, so that the stroller can stably stop in place and be safer to use. When the locking member 300 is rotated to the unlocked position, the locking member 300 is separated from the locking slot 221. At this time, the fixed casters 220 can rotate freely, making it convenient for a user to push, pull, and move the stroller. It is convenient and labor-saving to move the product.

In this embodiment, the locking member 300 includes a pedal 310 and a locking rod 320 connected to an outer side of the pedal; the pedal 310 is configured to allow a user to step or lift; and the locking rod 320 is inserted or separated from the locking slots 221. By the arrangement of the above structure, due to the arrangement of the pedal 310, it is convenient for a user to rotate the locking member 300. During use, the user only needs to step on the pedal 310 downwards to insert the locking rod 320 into the locking slots 221, thus completing the fixation of the fixed casters 220. When the fixed casters 220 need to be unlocked, the user simply lifts the pedal 310 upwards. In this operation process, the user does not need to bend down, and the operation is simple.

In this embodiment, the locking rod 320 includes locking portions 321 on two sides, a connecting portion 322 in the middle, and curved transition portions 323 between the locking portions 321 and the connecting portion 322; the pedal 310 is connected to the connecting portion 322; the locking portions 321 are inserted or separated from the locking slots 221; and the transition portions 323 extend outwards in a direction facing away from the first bracket assembly 110. By the arrangement of the above structure, the curved transition portions 323 can make the connecting portion 322 and the pedal 310 arranged at the connecting portion far away from the first bracket assembly 110. This increases a distance between the pedal 310 and the first bracket assembly 110, so that the operation is easier and simpler when a user steps on or lifts the pedal 310. Furthermore, this increases a turning moment, so that rotating the locking member 300 is effortless.

In this embodiment, friction lines 311 are arranged on an upper surface of the pedal 310. By the arrangement of the above structure, the friction lines 311 can increase a friction coefficient of an upper surface of the pedal 310. When a user steps on the pedal 310, a friction force between the sole of the foot of the user and the upper surface of the pedal 310 is increased, so that it is easier for the user to step on the pedal 310. The operation is simple.

In this embodiment, the folding stroller further includes several clamping members 400; the clamping members 400 are provided with openings facing downwards; the clamping members 400 are clamped on the upper connecting bracket assembly; and the clamping members 400 are configured to clamp and fix a lining 500 on the upper connecting bracket assembly. By the arrangement of the above structure, the clamping members 400 are roughly in a "C" shape, and the openings can allow the lining 500 and the upper connecting bracket assembly 131 to pass through. The clamping members 400 connects the lining 500 to the upper connecting bracket assembly 131, which can prevent the lining 500 from slipping and being separated and ensure the stability of the product.

In this embodiment, the folding stroller further includes several supporting members 180; the supporting members 180 are connected to an upper part of the first bracket assembly 110 and/or an upper part of the second bracket assembly 120; and the supporting members 180 are configured to support a cover 600. By the arrangement of the above structure, during use, the cover 600 is connected to tops of the supporting members 180, so that the cover 600 can be stably connected and fixed for effective shading from sunlight and rain, thereby improving the user experience. Preferably, the supporting members 180 can be detachably connected to the upper part of the first bracket assembly 110 and/or the upper part of the second bracket assembly 120. When the cover 600 does not need to be used, the supporting members 180 can be removed to reduce the volume of the product.

In this embodiment, the folding stroller further includes a bearing member 190; the bearing member 190 is connected to a middle part of the first bracket assembly 110 and extends in a direction facing away from the first bracket assembly 110; and the bearing member 190) is configured to bear and support an accommodate lining 700. By the arrangement of the above structure, during use, the accommodating lining 700 can be connected to the bearing member 190 to form an accommodating space; tissues, umbrellas, and other debris can be stored in the accommodating space. Moreover, the bearing member 190 is arranged at the middle part of the first bracket assembly 110 and extends in the direction facing away from the first bracket assembly 110. The bearing member is located below the push rod assembly 171, so that it will not enlarge the lateral volume of the product. The space below the push rod assembly 171 can be reasonably used. Furthermore, this space is closer to a user, so that it is convenient for the user to fetch and store items.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

The invention claimed is:

1. A folding stroller, comprising a framework (100) and wheels (200) mounted at a bottom of the framework (100), wherein the framework has a folded state and an unfolded state; the framework (100) comprises:
   a first bracket assembly (110);
   a second bracket assembly (120), wherein the second bracket assembly (120) and the first bracket assembly (110) are arranged at front and back oppositely;
   a connecting bracket assembly (130), wherein two ends of the connecting bracket assembly (130) are respectively connected to the first bracket assembly (110) and the second bracket assembly (120); and
   a supporting assembly (140), wherein a connecting end of the supporting assembly (140) is rotatably connected to the connecting bracket assembly (130), and sliding ends of the supporting assembly (140) are slidably connected to the first bracket assembly (110) and the second bracket assembly (120); and
   a locking assembly (150);
   when the framework (100) is switched between the folded state and the unfolded state, the connecting end of the supporting assembly (140) rotates relative to the connecting bracket assembly (130), and the sliding ends of the supporting assembly (140) slide along the first bracket assembly (110) and the second bracket assembly (120); and the connecting bracket assembly (130) rotates relative to the first bracket assembly (110) and the second bracket assembly (120); and
   wherein the locking assembly (150) is arranged at the sliding ends of the supporting assembly (140); the locking assembly (150) moves between a locked position and an unlocked position; a locking hole (101) is provided on the first bracket assembly (110) and/or the second bracket assembly (120); and when the framework (100) is in the unfolded state, the locking assembly (150) moves to the locked position, and the locking assembly (150) is inserted into the locking hole (101).

2. The folding stroller according to claim 1, wherein the locking assembly (150) comprises a locking block (151) and an elastic member (152); a locking block slot (1401) is provided at one of the sliding ends of the supporting assembly (140); the locking block (151) is slidably arranged in the locking block slot (1401); the elastic member (152) is arranged in the locking block slot (1401) and abuts against the locking block (151); and the elastic member (152) drives the locking block (151) to move towards the locked position.

3. The folding stroller according to claim 2, wherein the locking assembly (150) further comprises a driving member (153) and a transmission rope (154); the driving member (153) is arranged on one side of the connecting bracket assembly (130) close to the connecting end of the supporting assembly (140); one end of the transmission rope (154) is connected to the driving member (153), and the other end of the transmission rope (154) extends along the interior of a portion of the supporting assembly (140) to one of the sliding ends of the supporting assembly (140) and is connected to the locking block (151).

4. The folding stroller according to claim 3, wherein the connecting bracket assembly (130) comprises an upper connecting bracket assembly (131) and a lower connecting bracket assembly (132); two ends of the upper connecting bracket assembly (131) are respectively connected to an upper end of the first bracket assembly (110) and an upper end of the second bracket assembly (120); and two ends of the lower connecting bracket assembly (132) are respectively connected to a lower end of the first bracket assembly (110) and a lower end of the second bracket assembly (120).

5. The folding stroller according to claim 4, wherein the upper connecting bracket assembly (131) comprises a first rod (131*a*), a second rod (131*b*), and a third rod (131*c*); a first end of the first rod (131*a*) is rotatably connected to the upper end of the first bracket assembly (110); a first end of the third rod (131*c*) is rotatably connected to the upper end of the second bracket assembly (120); and two ends of the second rod (131*b*) are respectively rotatably connected to a second end of the first rod (131*a*) and a second end of the third rod (131*c*).

6. The folding stroller according to claim 5, wherein the lower connecting bracket assembly (132) comprises a fourth rod (132*a*), a fifth rod (132*b*), and a sixth rod (132*c*); a first end of the fourth rod (132*a*) is rotatably connected to the lower end of the first bracket assembly (110); a first end of the sixth rod (132*c*) is rotatably connected to the lower end of the second bracket assembly (120); and two ends of the fifth rod (132b) are respectively rotatably connected to a second end of the fourth rod (132a) and a second end of the sixth rod (132c).

7. The folding stroller according to claim 6, wherein a middle part of the second rod (131b) extends downwards to form a connecting rod (131d); the driving member (153) is T-shaped and is provided with a sliding channel (1531); and the connecting rod (131d) is inserted into the sliding channel (1531) to allow the driving member (153) to slide along the connecting rod (131d).

8. The folding stroller according to claim 7, wherein the supporting assembly (140) comprises two first supporting assemblies (141); connecting ends of the two first supporting assemblies (141) are rotatably connected to the connecting rod (131d); and the sliding ends of the two first supporting assemblies (141) are respectively slidably connected to the first bracket assembly (110) and the second bracket assembly (120).

9. The folding stroller according to claim 8, wherein the supporting assembly (140) further comprises two second supporting assemblies (142); first ends of the two second supporting assemblies (142) are respectively rotatably connected to middle parts of the two first supporting assemblies (141); and second ends of the two second supporting assemblies (142) are respectively rotatably connected to the fourth rod (132a) and the sixth rod (132c).

10. The folding stroller according to claim 1, further comprising a fixing member (160), wherein a first end of the fixing member (160) is connected to the first bracket assembly (110); a second end of the fixing member (160) is detachably connected to the second bracket assembly (120); when the framework (100) is in the folded state, the second end of the fixing member (160) is connected to the second bracket assembly (120); and when the framework (100) is in the unfolded state, the second end of the fixing member (160) is separated from the second bracket assembly (120).

11. The folding stroller according to claim 1, further comprising a push rod assembly (171) and a lock fastener (172), wherein the push rod assembly (171) is rotatably connected to the first bracket assembly (110); the lock fastener (172) is connected to the push rod assembly (171) and the first bracket assembly (110); and the lock fastener (172) is configured to allow for or hinder relative rotation between the push rod assembly (171) and the first bracket assembly (110).

12. The folding stroller according to claim 1, wherein the wheels (200) comprise movable casters (210) and fixed casters (220); the movable casters (210) are connected to a bottom of the second bracket assembly (120); and the fixed casters (220) are connected to a bottom of the first bracket assembly (110).

13. The folding stroller according to claim 12, further comprising a locking member (300), wherein the locking member (300) is rotatably connected to the first bracket assembly (110) and moves between the locked position and the unlocked position; several locking slots (221) are provided on inner sides of the fixed casters (220); when the locking member (300) is rotated to the locked position, the locking member (300) is inserted into the locking slots (221); and when the locking member (300) is rotated to the unlocked position, the locking member (300) is separated from the locking slots (221).

14. The folding stroller according to claim 13, wherein the locking member (300) comprises a pedal (310) and a locking rod (320) connected to an outer side of the pedal; the pedal (310) is configured to allow a user to step or lift; and the locking rod (320) is inserted or separated from the locking slots (221).

15. The folding stroller according to claim 14, wherein the locking rod (320) comprises locking portions (321) on two sides, a connecting portion (322) in the middle, and curved transition portions (323) between the locking portions (321) and the connecting portion (322); the pedal (310) is connected to the connecting portion (322); the locking portions (321) are inserted or separated from the locking slots (221); and the transition portions (323) extend outwards in a direction facing away from the first bracket assembly (110).

16. The folding stroller according to claim 14, wherein friction lines (311) are arranged on an upper surface of the pedal (310).

17. The folding stroller according to claim 4, further comprising several clamping members (400), wherein the clamping members (400) are provided with openings facing downwards; the clamping members (400) are clamped on the upper connecting bracket assembly; and the clamping members (400) are configured to clamp and fix a lining (500) on the upper connecting bracket assembly.

18. The folding stroller according to claim 1, further comprising several supporting members (180), wherein the supporting members (180) are connected to an upper part of the first bracket assembly (110) and/or an upper part of the second bracket assembly (120); and the supporting members (180) are configured to support a cover (600).

19. The folding stroller according to claim 1, further comprising a bearing member (190), wherein the bearing member (190) is connected to a middle part of the first bracket assembly (110) and extends in a direction facing away from the first bracket assembly (110); and the bearing member (190) is configured to bear and support an accommodate lining (700).

* * * * *